Dec. 24, 1968    B. B. JONES, JR    3,417,543
BAG CLOSING MACHINE

Filed Aug. 2, 1965    6 Sheets-Sheet 1

INVENTOR
BENJAMIN B. JONES, JR
Cushman, Darby & Cushman
ATTORNEYS

Dec. 24, 1968  B. B. JONES, JR  3,417,543
BAG CLOSING MACHINE
Filed Aug. 2, 1965  6 Sheets-Sheet 2

INVENTOR
BENJAMIN B. JONES, JR.
BY Cushman, Darby & Cushman
ATTORNEYS

Dec. 24, 1968   B. B. JONES, JR   3,417,543
BAG CLOSING MACHINE
Filed Aug. 2, 1965   6 Sheets-Sheet 3

INVENTOR
BENJAMIN B. JONES, JR.

BY Cushman, Darby & Cushman
ATTORNEYS

Dec. 24, 1968   B. B. JONES, JR   3,417,543
BAG CLOSING MACHINE
Filed Aug. 2, 1965   6 Sheets-Sheet 4

INVENTOR
BENJAMIN B. JONES, JR.
BY Cushman, Darby & Cushman
ATTORNEYS

United States Patent Office 3,417,543
Patented Dec. 24, 1968

3,417,543
BAG CLOSING MACHINE
Benjamin B. Jones, Jr., Savannah, Ga., assignor to Savannah Sugar Refining Corporation, Savannah, Ga., a corporation of New York
Filed Aug. 2, 1965, Ser. No. 476,431
21 Claims. (Cl. 53—126)

ABSTRACT OF THE DISCLOSURE

Apparatus for forming uniform closures of open mouthed bags each having two opposite sides, two opposite ends and a bottom comprising: means for filling flowable material into each bag up to a level which is below the top of each bag; means forcing the portions of said opposite sides which are above said level toward one another: means engaging the opposite ends of each bag above said level centrally of each end and forcing said opposite ends generally convexly toward one another to form incipient gables; means forcing said opposite side portions into close lateral adjacency, means simultaneously engaging each incipient gable substantially at said level thereby forming a laterally flattened vertically upwardly projecting top portion on each bag, a transitional region overlying said level and uniform gables at each end of the flattened top portion; means forcing the transitional region into contact with the flowable material at said level; and means sealing each flattened bag top portion to close the bags and prevent egress of said flowable material therefrom.

The foregoing abstract is not intended to be a comprehensive discussion of all of the principles, possible modes or applications of the invention disclosed in this document and should not be used to interpret the scope of the claims which appear at the end of this specification.

---

The present invention relates to packaging machinery and more particularly to apparatus for closing and securing the mouths of filled bags exemplified but not limited to bags having particulate sugar or similarly flowable material therein.

Prior art apparatus for closing bags of this type is generally divided into those exhibiting intermittent or indexing movement of bags and those having continuous movement of bags through various stations in the apparatus. Typically in such machinery, the operations of the various stations are coordinated by a complex cam or group of cams, timing gears, Geneva drives and such like.

Drawbacks of such means for coordinating of operations include the difficulty of starting and stopping the apparatus since some of the first stations continue to go through their operations after the last bag has passed them and some of the last stations commence operation before the first bag has reached them. In addition, misorientation of one bag may often result in the damaging or waste of several partially closed bags in the machinery upstream from the misoriented bag. Many such machines also require an unvarying rate of input of bags inserted into the apparatus at precise moments during its cycling.

It is the primary object of the present invention to provide apparatus for efficiently closing, folding and sealing the mouths of bags that have been filled with material by other apparatus not a part of the present invention per se.

It is a further object of the present invention to provide continuously operating apparatus of the type described wherein no maximum limitation is placed on the distance or time between input of bags to the apparatus.

Another object of this invention is the provision of apparatus of the type described wherein the several stations for operating on the bags are activated by the sensation of bags at the stations.

A more general object of the invention is the provision of means for orienting material within bags and sealingly closing them so that the material uniformly assumes a desired shape and the bag interiors uniformly conform to said shape so that the package exteriors have a neat, uniform appearance and no waste space is left between the top of the material and the top of the bag interior within the closed bag in order to minimize storage space, conserve bag material and reduce allowable bag distortion due to shifting of bag contents in the closed bags.

Further objects of the invention include means for more efficiently scoring and more uniformly shearing the bag tops in order to form more sure and more uniform seals at the bag tops. These and other objects of the present invention as well as the objects and scope of advantageous applicability thereof will become more clearly apparent during the course of the following detailed discussion of the preferred embodiment of the apparatus, shown in the annexed drawings.

In the drawings:

FIGURES 11a—11g are transverse sectional views taken substantially along lines a—a, b—b, c—c, d—d, e—e, f—f and g—g of FIGURE 10 respectively.

Figure 1:
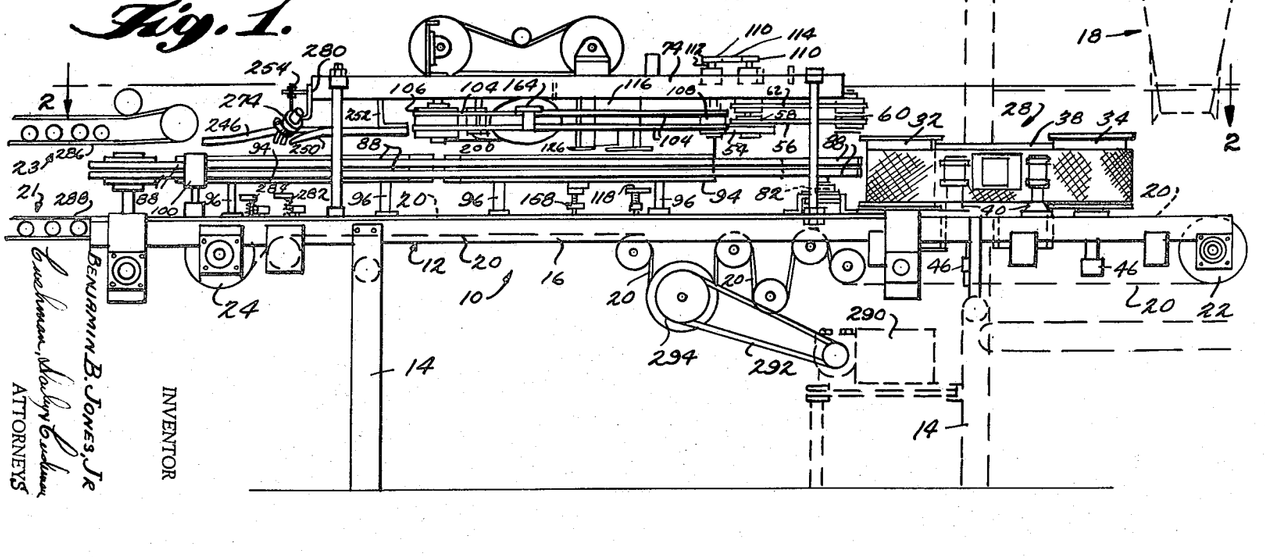
FIGURE 1 is a side elevation view of bag closing apparatus embodying principles of the present invention.

The bag closing machine 10 of FIGURE 1 is specifically dimensioned to close multiwall or single wall paper sacks or bags of particulate material such as five pound bags of sugar. Those skilled in the art will appreciate that the apparatus shown can be scaled to accept similar bags of other sizes. Apparatus 10 includes a suitable support frame 12 of metal tubes, angle irons, or the like having a plurality of floor engaging legs 14 and a main frame 16. The apparatus 10 most conveniently may be but one of several machines in a packaging line, for instance being downstream from a bag filling machine diagrammatically shown at 18 and upstream from a package conveyor and glue drier generally indicated at 21 and 23 respectively.

An endless wire belt conveyor 20 having its transverse elements in horizontal planes extends almost the complete length of the frame 16 between a terminal end pulley 22 and a terminal head pulley 24 supported throughout a major portion of the upper, forwarding section thereof by metal bars 26 such as 3/16 inch steel bars mounted on edge on approximately 5/8 inch centers, extending longitudinally of the main frame 16. As individual bags are filled at the station 18, they drop onto the conveyor 20 rightmost end. The conveyor support bars 26 are interrupted at the vibrating and forming station 28, FIGURES 1–3. The station 28 is shown including two transversely spaced endless belts 30 of woven wire or the like similar to conveyor 20. The belts 30 are received around drive pulleys 32 and tail pulleys 34 mounted on the main frame 16 for rotation about vertically directed axes in a sense wherein the forwarding sections of the belts 30 are vertically disposed face one another and move from right to left in the orientation of FIGURES 1 and 2. The belts 30 move at the same speed as the conveyor 20 and each bag carried thereon. The belts 30 are slightly convergent so the path between them laterally narrows forcing the belts into engagement with opposite sides of each bag to smooth and flatten the same so that the four corners of said sides form substantially right angles.

In the space between the forward and return sections of each belt 30 and between the pulleys 32 and 34 thereof are mounted vibrator assemblies 36 each of which includes a vertically directed side forming panel 38 such as an oak board positioned against the rear of each belt 30 forwarding section and mounted with respect to the main frame 16 by flexible mounts 40 comprising type 1002 "Scotchply" or the like which allow vibration of the panels 38 in a horizontal plane. A pair of similar panels 42, 44 are mounted one longitudinally downstream from the other for vibration in a vertical plane directly beneath the forwarding section of the conveyor 20. The leading edge of the panel 42 is preferably somewhat further downstream from the leading edge of the panels 38 and the trailing edge of the panel 44 is preferably somewhat further upstream from the trailing edge of the panels 38. Vibration of the side forming panels 38 and the bottom guide panels is produced by conventional means such as air operated linear vibrators 46 mounted on the panels 38, 42 and 44 centrally of the rear thereof. The vibration of the panels 38, 42 and 44 causes the side belts 30 and conveyor 30 to produce the desired forming effect wherein the material in the bag becomes fluid and tends to settle uniformly in the bag as the right angle corners are being formed as aforementioned. In the illustrative embodiment shown the belt 20 is six inches wide, the belts 30 are seven inches wide, the panels 38 are about 15 inches in length and the panels 42 and 44 each about 13 inches in length.

Figure 2:
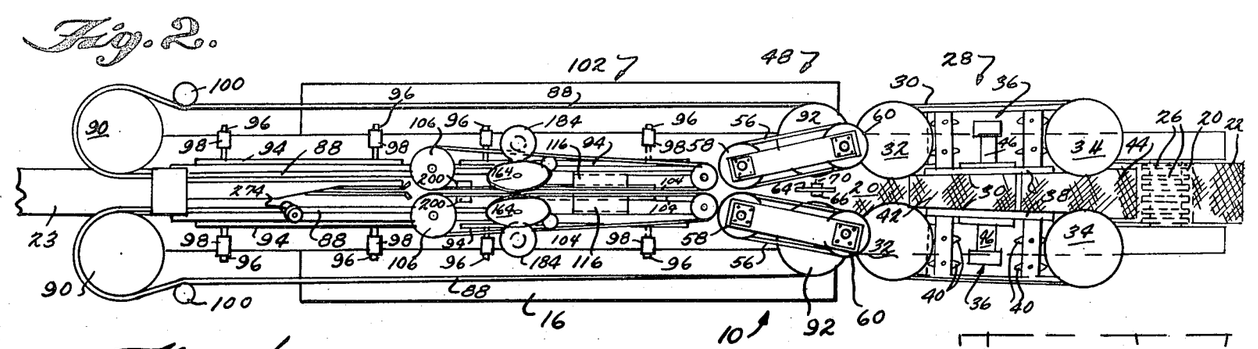
FIGURE 2 is a top plan view with parts in section along the line 2—2 of FIGURE 1.
Figures 4, 5, 8:
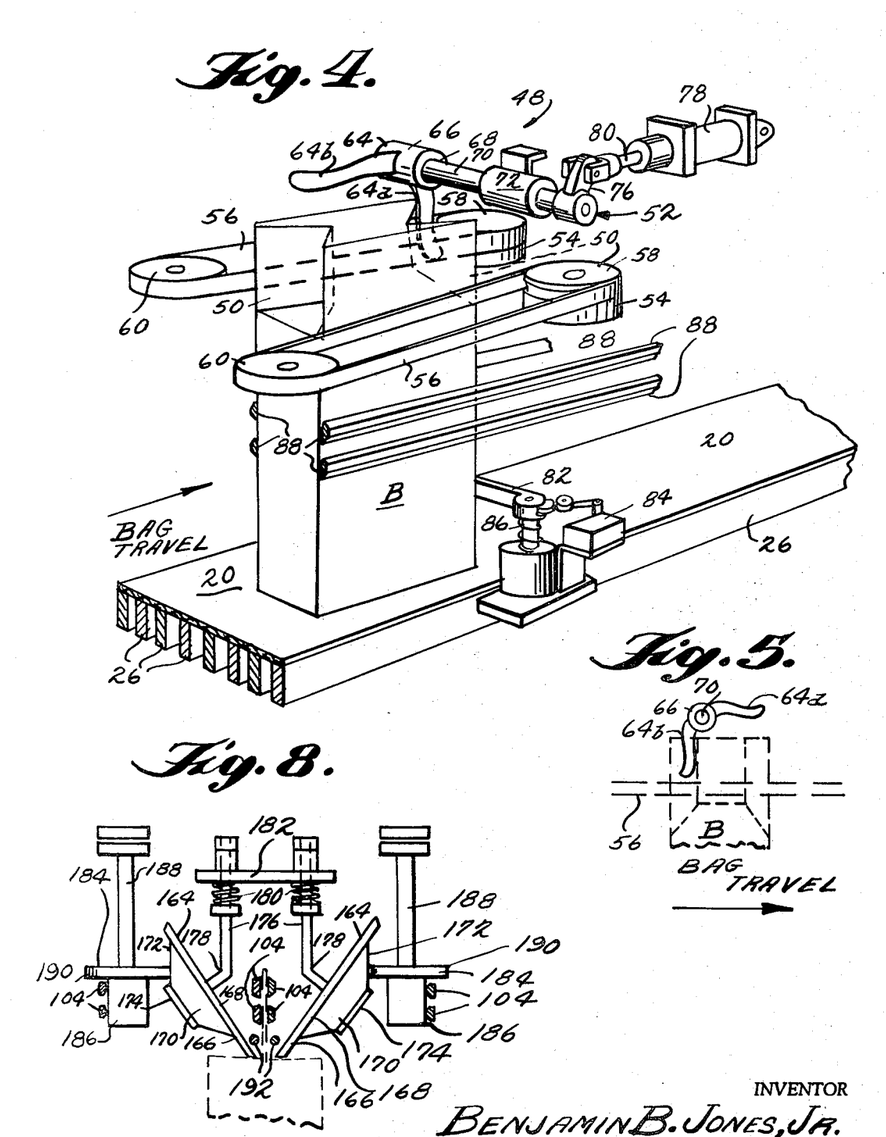
FIGURE 4 is a fragmentary perspective view of the gusset pre-tucking station of the apparatus of FIGURE 1.
FIGURE 5 shows a second position of the pre-tucker arm of FIGURE 4.
FIGURE 8 is an end elevation detail view of the tucker wheels of FIGURE 7 and the preferred drive means therefor.

Immediately upon leaving the bag forming and vibrating station, the bag enters the pre-tucking station 48, see FIGURES 1, 2, 4 and 5 wherein incipient gable holds 50 are formed in the bag B. The pre-tucking station 48 consists of a pre-tucker 52, two pre-tucker former wheels 54, and two endless side belts 56. The latter are preferably V-belts and are mounted in single groove drive pulleys 58 and tail pulleys 60 in turn journalled for rotation about vertical axes in flange bearing carrying support plates 62. As best seen in FIGURES 2 and 4 the pre-tucker side belts 56 converge to nearly define a V closing in the direction of bag travel by virtue of the fact that the drive pulleys 58 are closer to one another than are the tail pulleys 60. The belts 56 are adapted to engage opposite side walls of the bag above the material therein to form the initial closure of the bags.

The pre-tucker 52 includes a double ended finger 64 shown shaped similarly to a handlebar mustache, formed from metal plate as a casting or the like and mounted in a vertical plane over the longitudinal centerline of bag travel. The finger 64 includes a centrally disposed collar 66 having a cylindrical opening 68 which extends horizontally and transversely to the path of bag travel. A shaft 70 is received in the opening 68 and the finger is fixed to the shaft 70 by conventional keying and set screw means or the like. A sleeve bearing 72 is shown supporting the shaft 70 for reciprocation about its own longitudinal axis. The bearing 72 is in turn secured to the top frame support 74. A rocker arm 76 is secured to the opposite end of the shaft 70 from the finger 64 and is pivotally attached to the bifurcated outer end of a conventional air cylinder 78 piston rod 80 so that reciprocation of the rod 80 upon actuation of the cylinder 78 effects angular reciprocation of the shaft 70 and rocking of the finger 64.

The finger 64 is normally in the position shown in FIGURE 4 wherein the forwardly directed element thereof 64a is directed downwardly to intercept the top region of the longitudinally central area of the leading end of the bag. As the bag is moved forwardly by the belt 20, it strikes the finger element 64a, the latter in conjunction with the belts 56 convolute the top region of the bag leading end for the formation of a gable as shown in FIGURE 4. The bag B, as it strikes the finger element 64a also contacts a horizontally cantilevered pivoted sensing arm 82 mounted on the main frame 16 and extending into the path of the bag. The arm 82, in being swung forwardly by the bag B cams closes a switch 84 thereby activating an electric-air solenoid valve (not shown) which operates the air cylinder 78. The latter causes the finger 64 to rotate to the FIGURE 5 position thereof at a speed faster than that of the bag travel. Accordingly, the finger element 64b catches the top region of the longitudinally central area of the trailing end of the bag B from behind and in conjunction with the belts 56 convoluting the top region of the bag trailing end for the formation of a gable complementary to that begun in the bag leading end by the finger element 64a. After the bag passes the arm 82, a spring 86 returns it to rest position thus allowing the switch 84 to open and the air cylinder to return the finger 64 to the FIGURE 4 position thereof, ready to intercept a subsequent bag.

The pre-tucker side belts 56 are positioned sufficiently above the level of the conveyor 20 to engage the sides of the bag B above the level of the material therein and, because of their convergence, bring the sides together in this region to form an initial closure of the bag. According to the preferred form of the present invention as shown, each belt 56 forms the hypotenuse of a triangle with a side of the bag and therefore in order to produce a smooth closure, the belts 56 are moved at a slightly faster rate than that of bag travel. The pre-tucker side belts 56 may be positioned at an adjustable distance down from the top edges of the bag B. Preferably this distance is in the range from one-quarter inch to two inches for five pound bags of sugar or the like, the optimum distance being about one inch from bag top edge to belt top edge. As best seen in FIGURE 2, the pre-tucker side belts 56 initially contact the bag sides in their top region immediately after the bag sides in their lower region have made initial contact with the horizontal side V-belts 88. The front drive pulleys 58 as best seen in FIGURES 1 and 4 have the pre-tucker forming wheels 54 mounted beneath them. The wheels 54 are composed of hard rubber or the like and project radially outwardly a distance approximately equal to the outer extent of the belts 56 when in contact with the pulleys 58. In the embodiment shown, the wheels 54 are approximately one inch thick, have an O.D. of about 5.5 inches and serve to begin tucking and creasing of the bag top as the bag disengages from the pre-tucker belts 56. The side belts 88 include two vertically spaced belts on each side of the path of the bag B, entrained about two groove adjustable pitch diameter drive pulleys 90 and tail pulleys 92 mounted on the main frame 16 arranged to firmly grip the sides of the bag throughout the remainder of its travel through the bag closing machine 10. The belts 88 are preferably backed up in their forwarding section by outwardly facing, double U cross-sectioned guides or flat slide plates 94 preferably of a lubricous plastic material such as nylon or the like. The guides 94 are supported from the main frame 16 by vertically directed rods 96 which include horizontally outwardly directed resilient buffers 98 which carry the guides 94 at their outer ends and allow some horizontal movement thereof in so that the bag B is resiliently engaged by the side belts. Slack in the side belts 88 may conveniin the embodiment shown are composed of lubricous plastic material such as nylon and are spherical sector or frusto-conic shaped having outer edges that round into the faces of the wheels. The tucker wheels 164 are mounted downstream from the main top tucker with their smaller diameter faces 166 directed laterally outwardly and downwardly about 30 degrees from vertical so that the radially outer edges 168 of the wheels 164 are generally horizontal at their lowest point of travel. The tucker wheels 164 each have rubber or the like friction drive members 170, shown frusto-conical in shape, secured to the faces 166 thereof. The angle of taper of the drive members 170 is such that the radially outer drive track 172 of each is vertical at its uppermost point of travel. The drive members 170 are secured to the tucker wheels by means such as bolted plates 174 which may also carry the wheel bearings (not shown) which mount the tucker wheels 174 for rotation at the lower ends of the shafts 176. The latter project coaxially from wheels 174 upwardly and toward one another, then bend at 178 and thereafter extend vertically to spring loaded mounting at 180 in a hinged plate 182 secured to the top frame support. The mounting suspends the wheels 174 so that their lowest point is about one-fourth inch below the material in the bag and allows the wheels to move resiliently upwardly and outwardly in the direction of bag travel in order to exert a squeezing action of the bag top at its base and press the tuck down firmly.

The tucker wheels 174 are preferably driven by way of friction disks 184 of aluminum or the like mounted on bearing drive rollers 186 journalled on the lower ends of vertically directed shafts 188 which depend from the top frame support. The bearing drive rollers 186 engage and are rotated by the outer faces of the top tucker V-belts 104 in the return section of the belts. The friction disks 184 are turned by and may be integral with the rollers 186. The radially outer surfaces 190 of the disks 184 are disposed vertically and drivingly engage the drive tracks 172 of the frusto-conical rubber members 170 at their upper extent. Preferably the ratios of the diameters of the various members of the tucker wheel drive train are such that the peripheral speed of the tucker wheels as they engage the bag is slightly greater than the forward travel speed of the bag, the wheels thus slipping slightly with respect to the bag due to their lubricous nature and enhancing the squeezing action of the wheels. It should be noted that as the bag is acted upon by the wheels 174, the bag top is still being held by the top tucker V-belts 104. The passage of the bag beneath the tucker wheels 174 completes the tucking of the bag B. In order to hold the tuck firmly against the bag contents, two spring steel guide rods 192 are mounted from a fixed support 194 just upstream from the tucker wheels 174 and curve downwardly and downstream parallel to one another on either side of the tucked bag top.

Just above and in vertical alignment with the points of engagement of the tucker wheels 174 and the tucked bag top the rods 192 have curved to a horizontal condition and extend from there downstream toward the top tucker V-belt drive pulleys 106. The portions of the rods 192 extending between the tucker wheels 174 and the free ends 196 receive the bag top from the wheels and hold the tuck against the material within the bag until the bag reaches the creasing and shearing assembly 198. The rods 192 insure that the top of each bag passing through the machine 10 will be trimmed and scored at a uniform height from the material level in the bag so as to produce bags which are uniform in appearance.

With reference to FIGURE 1, the bag B passes from the tucking and forming station to the cutting creasing gluing and folding station as it leaves the free ends of the rod 192.

Figures 3, 7:
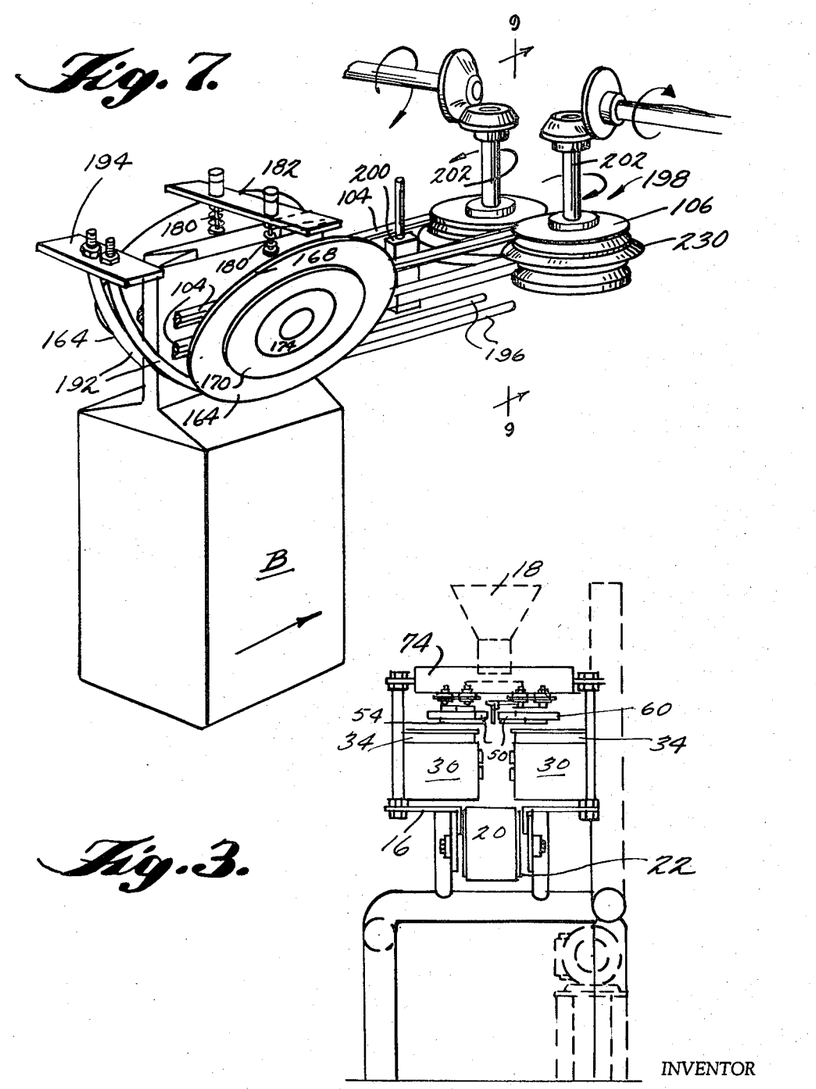
FIGURE 3 is an end elevation view of the right end of the apparatus of FIGURE 1.
FIGURE 7 is a fragmentary perspective view of the tucker wheels and top creasing and shearing station.
Figure 9:
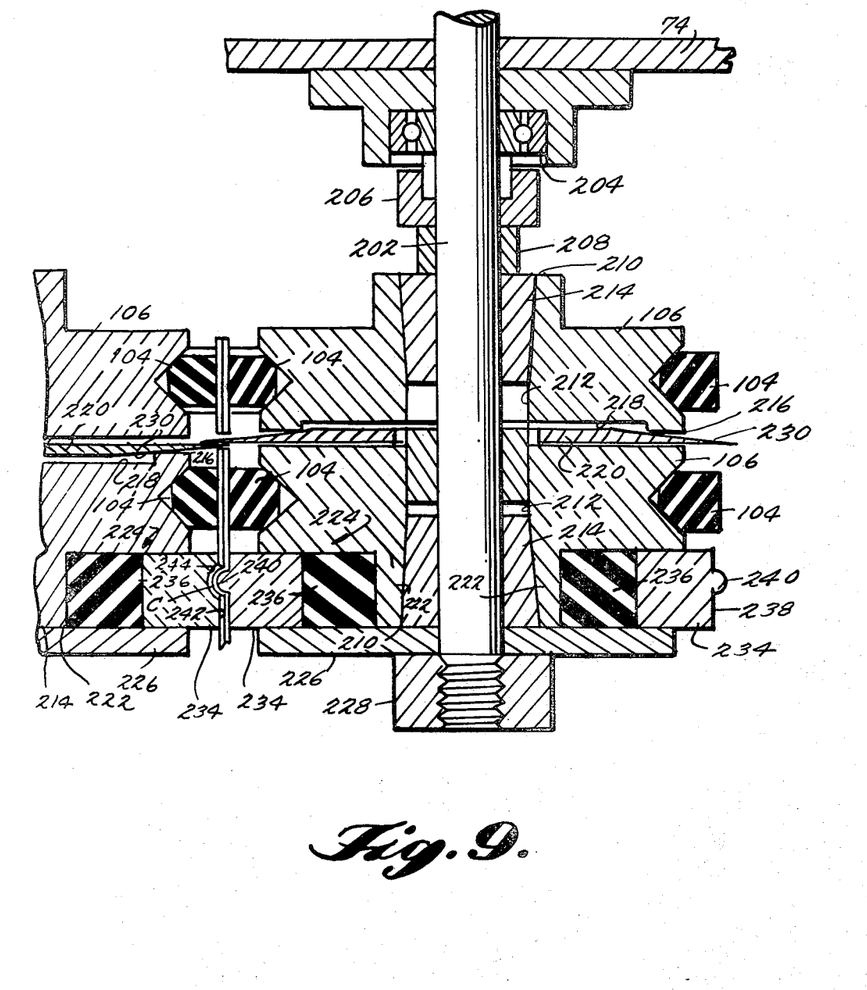
FIGURE 9 is a fragmentary vertical sectional view taken substantially along line 9—9 of FIGURE 7.
Figures 10, 11:
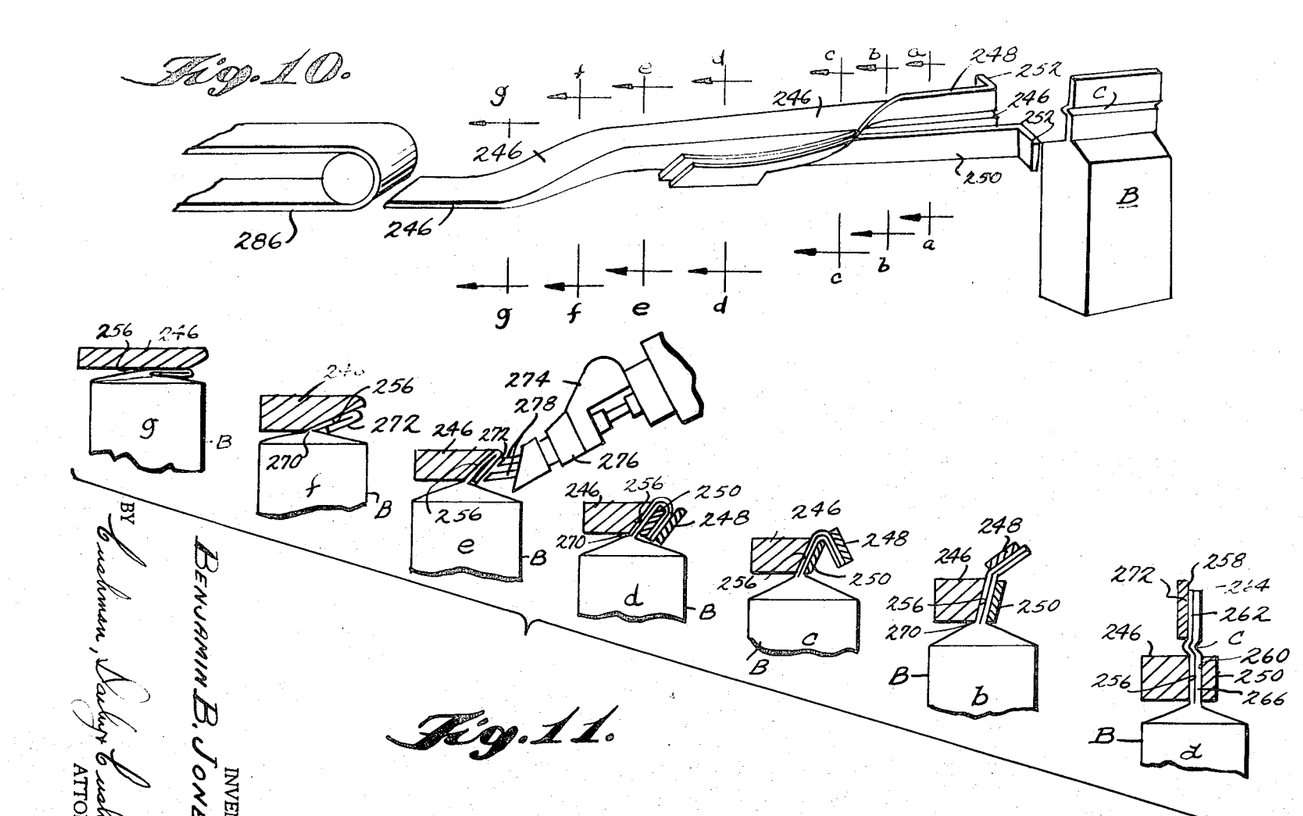
FIGURE 10 is a fragmentary perspective view of the top fold-over and securement station of the apparatus of FIGURE 1.

As the top tucker V-belts 104 approach the drive pulleys 106 they are guided by nylon guide blocks 200 suspended from the top frame support and which are grooved complementarily to the V-belts. Turning to FIGURES 7 and 9, it can be seen that the two shafts 202 which extend through and are supported from the top frame support by bearings 204 mount a plurality of elements beneath the bearings 204 for rotation with the shafts 202. In FIGURE 9 bearing caps 206 are shown subjacent the bearings 204 followed by annular spacer rings 208. Below each spacer ring 208 is a first drive pulley 106 having an upwardly enlarging frusto-conical counterbore 210 in the central bore 212 thereof for receiving a tapered lock bushing 214 which keys the upper drive pulley 106 to the shaft 202. A lower drive pulley 106 having a downwardly enlarging counterbore 210 in its central bore 212 is similarly keyed to the shaft 202 by a bushing 214. The lower face 216 of one upper drive pulley 106 and the upper face 216 of one lower drive pulley 106 are shown centrally annularly relieved at 218 to receive a disk-like knife wheel 220 interposed between the upper and lower drive pulley 106 on each shaft 202. The knives project outwardly beyond the pulleys 106 and do not bottom in these recesses. The space left between the knives and the recess bottoms facilititates slight cupping of the knives by tightening their securement in order to increase the pressure of the shearing engagement of the knives as will be described. The knives 220 are keyed to the shafts 202 by locking rings received in the bores 212 of the lower drive pulleys 106. The lower drive pulleys 106 each have a downwardly directed annular flange 222 about which are received creaser-scoring wheels 224. An annular retaining plate 226 abuts the lower end of each flange 222 and the assemblies are removably retained as described by locking nuts 228 threadably received on the lower ends of the shafts 202 abuttingly engaging the retaining plates 226.

It should be noticed that one knife 220 has its frusto-conical cutting edge forming surface 230 directed upwardly and the other knife 220 has its surface 230 directed downwardly, the proximity of the shafts 202 and diameter of the knives 220 being such that they overlap slightly, for instance about one-sixteenth inch, and the faces 232 of the knives engage one another in the overlapping region to intercept and cut the bag top in a scissors-like fashion.

From FIGURE 9, it can be seen that the outside diameter of the cutting knives 220 is slightly greater than the outside diameter of the V-belts 104 as they pass around the pulleys 106 and are in engagement with the bag top. Since the linear spread of the belts 104 matches that of the bag, the peripheral speed of the cutting edges of the knives is slightly greater than that of the bag top as they engage it. This aids the cutting action of the knives and helps pull the bag top through the cutting knife wheels to produce a smooth straight cut. At this point, the bag top is still being guided and firmly held by the top tucker V-belts 104. The sheared off portion of the bag top is collected and disposed of by conventional means.

The creaser-scoring wheels 224 each include an outer annular portion 234 of metal or the like and a radially inner annular spacer member 236 of stiffly resilient material such as neoprene rubber which at its radially inner extent abuts the flange 222 and at its radially outer extent engages the metal portion 234. The radially outer surface 238 of one portion 234 has an integral radially outwardly projecting bead 240 of substantially semi-circular radial cross-section. The radially outer surface 242 of the other portion 234 has a radially outwardly opening groove 244 of substantially semi-circular radial cross-section. The bead 240 and groove 244 have substantially complementary curvature and are of such diameter, that in the rest position shown in FIGURE 9, the bead 240 is received in the groove 244 at the longitudinal centerline of the bag travel path. In order to score and crease the bag top for folding, it is important that the creaser-scoring wheels 224 tightly press against the bag material. In the apparatus of the present invention such action is provided by the ently be taken up by conventional means such as idler rollers 100 mounted on the main frame 16 adjacent the drive pulleys 90 in the return section of the belts 88. The belts 88 are driven at a speed equal to that of the conveyor 20.

As the bag top disengages from the pre-tucker belts 56 and pre-tucker wheels 54 it leaves the pre-tucking station and enters the bag top tucker station 102 where the bag is engaged by the top tucker belts 104. The latter preferably comprise four endless V belts running in horizontal circuits at two vertically spaced levels on both sides of the bag top between drive pulleys 106 and tail pulleys 108 all journalled in the top frame support.

As shown in FIGURE 1 the shafts on which the pre-tucker tail pulleys are mounted extend upward through the top frame support and receive sprockets 110 as do the idler shafts 112 on which the top tucker tail pulleys 108 are mounted. Roller chains 114 or the like operatively connect the pre-tucker drive pulley sprocket 110 and top tucker tail pulley sprocket 110 on each side of the machine 10. The top tucker belts 104 firmly grip opposite sides of the bag top throughout the length of the top tucking station. Because the bags are filled with relatively heavy material such as sugar are grippingly supported in their filled lower region by the horizontal side belts 88 and in their unfilled upper region by the top tucker belts 104 the bag area between the belts 88 and belts 104 is kept taut facilitating the formation of uniform tucks or gables creasing and cutting in the top tucking station.

Figure 6:
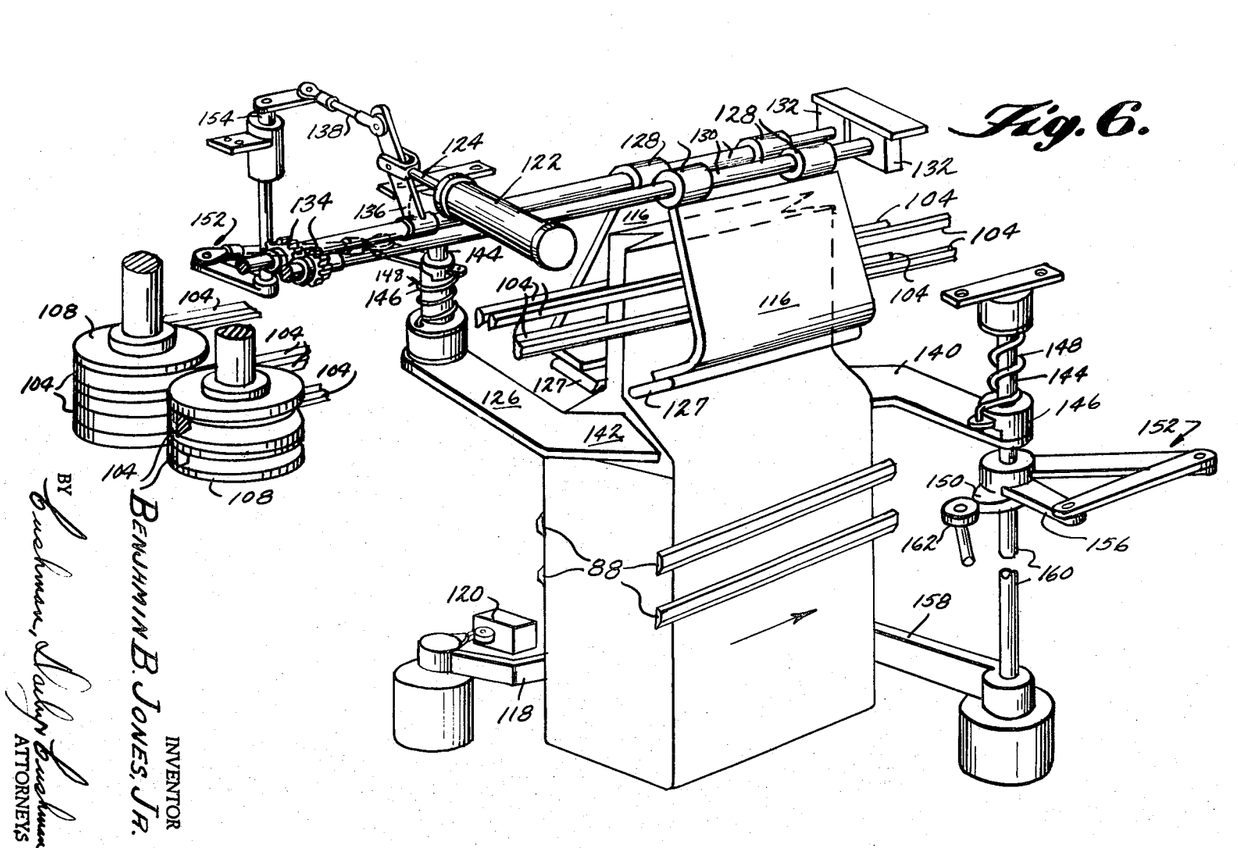
FIGURE 6 is a fragmentary perspective view of the top tucker, front and rear tucker arms and former station of the apparatus of FIGURE 1.

After the bag B has been engaged by the top tucker belts 104, it approaches the main top tuckers 116 and strikes the horizontally cantilevered actuating arm 118, see FIGURES 1 and 6. Continued advance of the bag B causes the arm 118 to cam a switch 120 closed, energizing an air-electric solenoid (not shown) which in turn operates an air cylinder 122. The air cylinder piston rod 124 thus strokes outwardly simultaneously initiating operation of the main top tuckers 116 and rear tucker arm 126.

The main top tuckers are approximately as wide longitudinally of the machine 10 as the bag top and are generally L-shaped in vertical transverse cross-section, being concave toward one another. Each tucker 116 carries a bar 127 of lubricous plastic material such as nylon secured to and extending inwardly beyond its lower inwardly and downwardly directed leg. At the upper end of its upwardly and inwardly directed leg, each tucker 116 carried longitudinally aligned collars 128 by which the tuckers are fixedly mounted on longitudinally extending horizontal laterally spaced shafts 130. The latter are journalled at each end in bearings 132 depending from the top frame support. Spaced along the shafts 130 from the tuckers 116 are gears 134 which intermesh and serve to drive one tucker 116 from the other. The shaft 130 of the driving tucker 116 is shown having a crank arm 136 secured thereto between its tucker 116 and gear 134. Intermediate its extent the crank arm 136 is pivotally secured to the bifurcated outer end of the air cylinder piston rod 124 and at its upper end to the operating lever 138 of the rear tucker arm 126 assembly. The front tucker arm 140 and rear tucker arm 126 are positioned downstream and upstream from the main top tucker respectively and are each adapted to swing horizontally about vertical axes positioned on laterally opposite sides of the bag travel path. The front and rear tucker arms are shown generally resembling hockey sticks, i.e., generally obtuse L-shaped, having V-shaped end portions 142 adapted to strike the bag ends. The tucker arms 126 and 140 are mounted on shafts 144 supported in bearings 146 ultimately carried by the top frame support. Preferably torsion spring loaded jaw clutch assemblies 146 are provided between the tucker arms and shafts 144 to provide positive movement of the tucker arms while allowing some give to prevent stalling of the bag by the front tucker arm and forward thrusting of the bag by the rear tucker arm such as might upset the bag. The front tucker arm 140 assembly includes a switch operating cam 150 mounted just below the tucker arm 140 on the shaft 144. The shafts 144 of both tucker arms are adapted to be arcuately reciprocated by multiplying linkages 152 which move the tucker arms about twice as fast as the input actuation of the linkages 152 for reasons that will appear.

The linkage 152 of the rear tucker arm 126 is fixed to a vertically directed shaft 154, journalled with respect to the top frame support and having a crank arm pivotally secured to the operating lever 138 of the air cylinder 122. The linkage 152 of the front tucker arm 140 projecting from the cam 150 crank arm 156 is communicated to a lever actuator arm 158 cantilevered into the path of the bag B by a bearing and support shaft 160 mounted on the main frame 16.

The various tucking station components just described are so positioned that upon striking of the top tucker and rear tucker arm actuating lever 118 operation of the air cylinder 122 is initiated by the switch 120 and as the bag travels forwardly and engages the front tucker arm the rear tucker arm by virtue of its multiplying linkage swings forwardly more rapidly than the bag is traveling and more rapidly than the top tuckers move toward one another. Accordingly, the bag ends are clamped between the front and rear tucker arms forming positive V-shaped tucks or gables slightly before and while the main top tuckers close tightly against the sides of the bag B as shown in FIGURE 6. The bowing of the top tuckers causes them to straddle the top tucker belts 104 therefore the latter hold the bag top taut as the tuckers, which engage the bag slightly above the level of material in the bag, make uniform folds in the bag.

The continued forward motion of the bag is facilitated by the above-mentioned spring loaded shaft and jaw clutch of the front tucker arm which allow the front tucker arm to move with the bag, and by the lubricous bars 127 on the top tuckers which allow the bag to slide with respect to the top tuckers even while they are clamped against the bag top. Upon reaching the position shown in FIGURE 6 wherein both the top tuckers and front and rear tucker arms are tight against the bag top, the bag forward end strikes the actuating arm 158. Rotation of the arm 158 by advance of the bag B rotates the front tucker arm rapidly out of the path of the bag. Such rotation also causes the cam 150 to actuate a microswitch 162 actuating a solonoid air valve (not shown) which returns the air cylinder 122 to its initial position thus opening the main top tuckers and returning the rear tucker arm to its initial position, out of the bag travel path. After the bag has passed the actuating arm, it and the front tucker arm are returned to their initial bag travel path blocking condition by the torsion spring 148 mounted on the shaft 144.

Preferably the switches 120 and 162 are electrically interlocked so that the switch 120 cannot energize the rear tucker arm and main top tucker operating cylinder 122 at the same time the switch 162 is depressed by a bag engaging the lever actuator arm 158. This ensures that the tucker mechanism will not prematurely operate due to a false signal and thus not be in an open position ready to accept and tuck the next bag. As the torsion spring 148 returns the front tucker arm to its initial position the cam 150 releases the switch 162, thus effecting closure of the normally closed contacts of the switch 162, completing a circuit which reactivates the interlock so that the switch 120 is free to operate when a succeeding bag strikes its actuating arm.

Immediately after passing through the top tucker mechanism just explained the bag B travels under the tucker wheels 164, see FIGURES 1, 2, 7 and 8, whose function is to firmly press the tucked portion of the bag downwardly and inwardly to exclude substantially all empty space between the top of the material and the tucked portion of the bag. The pair of tucker wheels 164 resilient spacers 236. These ensure that as a bag top passes between the wheels 224 and has a C-shaped crease formed therein by the bead 240 and groove 244 the wheels 224 will move horizontally away from one another in resilent eccentricity. The resileint spacers 236 ensure that sufficient creasing force will be applied regardless of the thickness of the particular bag top and thus will function properly even on a wrinkled or incorrectly folded bag and ensure that upon passage of each bag the wheels will return to concentricity and rest position clearance ready to receive the next bag.

The C-shaped crease C (FIGURES 10 and 11a) formed in the bag top is generally horizontal, extends the width of the bag sides and is concave in the direction that the bag will be folded over to complete the sealing operation (FIGURES 10, 11a–11g). The vertical distance between the engagement of the cutting knives and the bead 240 and groove 244 is fixed, thereby predetermining the width of the final folded seal of the bag B. The relatively large radii and the rounded shape of the bead and groove of the wheels 224 are significant since, instead of gathering, bursting or partially cutting the paper in the crease as is often with relatively small V-shaped creasers of the prior art, the wheels 224 provide smooth, unwrinkled creases wherein the paper on the convex side of the crease is stretched and that on the concave side is condensed.

As the bag B passes the cutter and top creaser assembly just described it enters the top folder and gluer station which includes top folder guide bar 246, external foldover bar 248 and internal fold-over bar 250 extending longitudinally on both sides of and above the path of travel of the now vertically shortened bag, to engage the top thereof. The bars 248 and 250 are supported in a cantilevered fashion near their upstream end by securement at 252 to the top frame support. The bar 246, is supported from the top frame support at 252 and 254. In the preferred embodiment shown the bar 246 is composed of lubricous plastic material such as nylon and the bars 248, 250 are made of stainless steel.

As can best be seen in FIGURE 11a at the upstream end of the folding station the main guide bar 246 abuts the vertical, flattened bag top side with a vertical side 256 which extends upwardly to the convex side of the crease C and downwardly to the flattened gabled portion of the bag. The external fold-over bar 248 slidingly engages the same side of the bag top with a vertical side 258 thereof as the bar 246 but above the crease C in the area 262 between the crease C and bag top upper edge 264. The internal fold-over bar 250 engages the opposite side of the bag top from the main guide bar with a vertical side 260. In the bag top area 266 between the flattened gabled portion of the bag and the concave side of the crease C.

As shown in FIGURES 11b–11g, the side 256 of the bar 246, originally vertical, becomes increasingly obliquely downwardly facing until it is nearly horizontally extending. In addition the bar 246 is shown becoming increasingly vertically thinner and laterally wider undergoing a transition from being adjacent one side of the bag top (FIGURE 11a) to being above the longitudinal centerline of the bag travel path.

The internal fold-over bar 250 undergoes a twisting so that the face 260 originally vertical (FIGURE 11a) remains parallel to the increasingly more horizontal bar 246 side 256 until reaching an approximately 45 degree cant as the bar 250 terminates (compare FIGURES 11e and 11f). The external fold-over bar 248 undergoes a spiralling translation laterally moving over the bag top longitudinal centerline and twisting about 225 degrees so that it is again parallel to the bar 250 (FIGURE 11d) as they both terminate.

The bag top passes through the folding station as follows. The vertical, tucked, cut and creased bag top enters the fold-over bars with the internal fold-over bar 250 engaging the side thereof toward which the fold will be made. As the bag progresses along the bars 246, 248, 250 the portion thereof above the crease C is folded laterally and downwardly about the crease C toward the bar 250 and the entire bag top flattened portion is folded about its base 270, toward the right of the FIGURES 11a–11g. At the termination of the bars 248 and 250 the folded top comprises an inverted U in cross-section, canted at approximately 45 degrees. At this point glue is applied to the region 272 and the folded top further rotated about base 270 until the region 272 is generally horizontal and secured to the gabled or tucked portion of the bag by the glue.

A preferred glue applicator assembly is shown at 274 although alternative devices could be employed. The glue applicator or assembly 274 includes a glue reservoir (not shown) communicated to an air operated valve 270 adapted when actuated to supply glue under pressure to the flexible plastic tubes 278. The valve 276 is supported from the top frame support by a bracket 280 so that the tubes 278 are close to or in sliding contact with the region 272 in a vertically spaced relationship, (FIGURE 11e). The valve 276 is actuated and deactivated by microswitches 282, 284 respectively having pivotable actuating levers cantilevered from the main frame 16 into the path of the bag B. The length of the applied strips of adhesive depends upon the positioning and spacing of the microswitches 282, 284.

The plastic glue applicator tubes 278 also serve to complete the fold of the bag top and tuck the top flap thereof completely under so that it can be pressed down by the bar 246 (FIGURES 11f, 11g). As the bag B passes out from under the bar 246 the top thereof becomes engaged by an endless horizontal belt 286 and the bag supported on a similar horizontal endless belt 286. The belts 286, 288 convey the bag B from the machine 10 while drying the glue applied to the bag by compression of the bag between the belts and heat if necessary.

Preferably all operations of the machine 10 are powered by a single electric motor 290 through a roller chain drive 292 to the main drive pulley 294 shaft or similar conventional power transmission elements. The horizontal side belts 30, drive pulleys, main conveyor belt 20, top tucker V-belts are preferably communicated to this drive train, the connections shown in the drawings being exemplary. Because of the single power source, all of the conveying portions of the apparatus can be speed controlled as a unit. Conventional means for fine adjustment of individual members can also be provided.

The input of bags to the machine 10 is thus not limited to one conveying speed. The upper limit of speed is determined from the recovery time of the micro-switch operated stations such as the top tucker and front and rear tucker arms. The minimum spacing between bags is also determined by the time needed for recovery. However, the spacing between bags need not be uniform so long as it equals or exceeds the minimum spacing.

It should now be apparent that the apparatus disclosed herein efficiently accomplishes each of the objects of the present invention and clearly illustrates its principles and scope of applicability. Because the exemplary apparatus shown can be considerably modified without departing from the principles of the invention as they are outlined herein, the invention should be understood as encompassing all such modifications as are within the spirit and scope of the following claims.

I claim:

1. Apparatus for forming uniform closures of open mouthed bags each having two opposite sides, two opposite ends and a bottom comprising: means for filling flowable material into each bag up to a level which is below the top of each bag; means forcing the portions of said opposite sides which are above said level toward one another: means engaging the opposite ends of each bag above said level centrally of each end and forcing said opposite ends generally convexly toward one another to form incipient gables; means forcing said opposite side portions into close lateral adjacency, means simultaneously engaging each incipient gable substantially at said level thereby forming a laterally flattened vertically upwardly projecting top portion on each bag, a transitional region overlying said level and uniform gables at each end of the flattened top portion; means forcing the transitional region into contact with the flowable material at said level; and means sealing each flattened bag top portion to close the bags and prevent egress of said flowable material therefrom; the means engaging the opposite ends of each bag above said level centrally of each end comprises a shaft positioned above each bag, finger means projecting radially from said shaft and forwardly and rearwardly of each bag, means for reciprocating said shaft about its own longitudinal axis thereby striking the forward end of each bag with the finger means projecting forwardly of each bag and striking the rearward end of each bag with the finger means projecting rearwardly of each bag.

2. Apparatus as set forth in claim 1 wherein said bags are sequentially conveyed into the path of said finger means by a continuous conveyor.

3. Apparatus as set forth in claim 2 further including bag presence sensing means operatively connected to said shaft whereby said shaft and finger are reciprocated upon the sensation by said sensing means of a bag passing beneath said finger means.

4. Apparatus for forming uniform closures of open mouthed bags each having two opposite sides, two opposite ends and a bottom comprising: means for filling flowable material into each bag up to a level which is below the top of each bag; means forcing the portions of said opposite sides which are above said level toward one another: means engaging the opposite ends of each bag above said level centrally of each end and forcing said opposite ends generally convexly toward one another to form incipient gables; means forcing said opposite side portions into close lateral adjacency, means simultaneously engaging each incipient gable substantially at said level thereby forming a laterally flattened vertically upwardly projecting top portion on each bag, a transitional region overlying said level and uniform gables at each end of the flattened top portion; means forcing the transitional region into contact with the flowable material at said level; and means sealing each flattened bag top portion to close the bags and prevent egress of said flowable material therefrom; means for continuously conveying the bags past the means forcing the transitional region into contact with the flowable material at said level, the latter means comprising a pair of rotatable disks mounted at acute angles to said flattened top portions and positioned to resiliently engage said bags adjacent the juncture of each bag flattened top portion and transitional region.

5. Apparatus as set forth in claim 4 further comprising means for continuously conveying said bags into underlying relationship to said means for forcing said opposite side portions into close lateral adjacency, bag presence sensing means operatively connected to the last-mentioned means; said means for forcing said opposite side portions into a close lateral adjacency comprising generally L-shaped tucker arms having lower leg portions angled toward one another and arranged to engage said opposite side portions, means for rotating said tucker arms toward and away from one another about generally horizontal axes parallel to the path of travel of said bags on said continuous conveying means, said arms being rotatable toward one another upon the sensation of the presence of a bag by said bag presence sensing means.

6. The apparatus of claim 5 wherein each of said arms is as wide as each side of said bags.

7. The apparatus of claim 5 wherein the ends of said legs are composed of lubricous material.

8. The apparatus of claim 5 further including means engaging said bag opposite side portions above the line of engagement of said legs and said bags to prevent said legs pulling said bag opposite side portions down uncontrollably.

9. The apparatus of claim 8 wherein the last-mentioned engaging means comprises endless V-belts in engagement with said bag opposite side portions, and wherein said tucker arms straddle said endless V-belts.

10. The apparatus of claim 4 wherein the means simultaneously engaging each incipient gable substantially at said level comprise a pair of generally horizontally directed arms each having a V-shaped forward profile.

11. The apparatus of claim 10 including means for swinging said horizontally directed arms into and out of engagement with said bags.

12. The apparatus of claim 11 further including means for continuously conveying said bags past said means for simultaneously engaging each incipient gable.

13. The apparatus of claim 12 further comprising means for sensing the presence of a bag, and means operatively connected to said horizontally directed arms to effect swinging of said arms into engagement with a bag in response to a sensation of the presence of a bag by said sensing means.

14. The apparatus of claim 4 wherein the disks are arranged to depress the material in each bag.

15. The apparatus of claim 14 wherein said disks are composed of lubricous material adjacent the outer periphery of each.

16. The apparatus of claim 15 further including means rotating said disks at a rim speed slightly greater than the speed of travel of said bags on said continuously conveying means.

17. The apparatus of claim 16 further including means operatively engaging said transitional region of each bag as it issues from engagement by said disks for retaining said material in a depressed condition.

18. Apparatus for forming uniform closures of open mouthed bags each having two opposite sides, two opposite ends and a bottom comprising: means for filling flowable material into each bag up to a level which is below the top of each bag; means forcing the portions of said opposite sides which are above said level toward one another: means engaging the opposite ends of each bag above said level centrally of each end and forcing said opposite ends generally convexly toward one another to form incipient gables; means forcing said opposite side portions into close lateral adjacency, means simultaneously engaging each incipient gable substantially at said level thereby forming a laterally flattened vertically upwardly projecting top portion on each bag, a transitional region overlying said level and uniform gables at each end of the flattened top portion; means forcing the transitional region into contact with the flowable material at said level; and means sealing each flattened bag top portion to close the bags and prevent egress of said flowable material therefrom; means for severing a strip of the flattened top portion of each bag from each bag at a uniform distance from the bottom of each bag before the bag is sealed; said severing means comprising counter-rotating knife disks rotatable about laterally spaced vertical axes, said knife disks vertically overlapping slightly and engaging one another in the overlap region defined thereby to operate in a shearing manner; each knife disk is mounted on a vertically directed shaft; each shaft having a creaser wheel mounted thereon below the knife disk mounted thereon; means defining a radially outwardly opening U-shaped peripheral groove in one of said creaser wheels; means defining a radially outwardly directed U-shaped peripheral bead on the other of said creaser wheels substantially complementary to said U-shaped peripheral groove; said U-shaped peripheral groove and said U-shaped peripheral bead being closely laterally adjacent one another at a point in vertical alignment with the knife disk overlap region whereby a C-shaped groove is formed in each bag flattened top portion below the point of the severing of a strip therefrom.

19. The apparatus of claim 18 wherein each creaser wheel includes an annular resilient portion intermediate the radially inner and radially outer extent thereof whereby said creaser wheels resiliently engage said bags and are forced into slight eccentricity with respect to said shafts by contact with said bag flattened top portions.

20. The apparatus of claim 18 including means for forming a generally horizontal C-shaped crease in each bag flattened top portion and wherein the sealing means comprises means for folding the region of each bag flattened top portion above each C-shaped groove downwardly about each C-shaped groove into lateral adjacency with the region of each bag flattened top portion below each C-shaped groove; means for applying an adhesive to each former region, means forcing each region to which adhesive has been applied into intimate contact with the transitional region of each bag; and means for maintaining such contact until the adhesive has set.

21. Apparatus for forming uniform closures of open mouthed bags each having two opposite sides, two opposite ends and a bottom comprising: means for filling flowable material into each bag up to a level which is below the top of each bag; means forcing the portions of said opposite sides which are above said level toward one another; means engaging the opposite ends of each bag above said level centrally of each end and forcing said opposite ends generally convexly toward one another to form incipient gables; means forcing said opposite side portions into close lateral adjacency, said forcing means simultaneously resiliently engaging said opposite side portions in a horizontally elongated, vertically narrow band substantially at said level thereby providing each bag with a laterally flattened, vertically upwardly projecting top portion on each bag, a transitional region overlying said level and gables at each end of the flattened top portion; means continuously conveying each bag past said forcing means; endless peripheral surface means engaging each of said bag opposite side portions above the band of engagement of said forcing means therewith, means supporting said endless peripheral surface means at a constant height and means driving said endless peripheral surface means at a peripheral speed substantially equal to the speed of conveyance of each bag past said forcing means to prevent said forcing means pulling said bag opposite side portions down uncontrollably; and means sealing each bag flattened top portion to close each bag and prevent egress of said flowable material therefrom.

References Cited

UNITED STATES PATENTS

| | | | |
|---|---|---|---|
| 1,931,280 | 10/1933 | Allison | 53—124 |
| 1,986,043 | 1/1935 | Carter | 53—45 |
| 1,998,287 | 4/1935 | Pierson et al. | 53—124 |
| 2,156,037 | 4/1939 | Wollenweber | 53—371 |
| 2,234,953 | 3/1941 | Belcher et al. | 141—77 X |
| 2,309,760 | 2/1943 | First | 53—45 X |
| 2,624,995 | 1/1953 | Allen | 53—371 |
| 2,641,880 | 6/1953 | Stone | 53—371 X |
| 2,662,357 | 12/1953 | Stone | 53—371 |
| 2,700,260 | 1/1955 | Paulsen | 53—372 |
| 2,890,554 | 6/1959 | Dolman et al. | 53—126 |

TRAVIS S. McGEHEE, *Primary Examiner.*

ROBERT L. FARRIS, *Assistant Examiner.*

U.S. Cl. X.R.

53—372, 373; 141—77